United States Patent
Osorio Martinez et al.

(10) Patent No.: US 12,188,452 B2
(45) Date of Patent: Jan. 7, 2025

(54) TOWER FOR A WIND TURBINE

(71) Applicant: Siemens Gamesa Renewable Energy Innovation & Technology S.L., Sarriguren (ES)

(72) Inventors: Juan Manuel Osorio Martinez, Burlada (ES); Vicente Señas Perez, Navarra (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 516 days.

(21) Appl. No.: 17/633,295

(22) PCT Filed: Jul. 28, 2020

(86) PCT No.: PCT/EP2020/071206
§ 371 (c)(1),
(2) Date: Feb. 7, 2022

(87) PCT Pub. No.: WO2021/028212
PCT Pub. Date: Feb. 18, 2021

(65) Prior Publication Data
US 2022/0282710 A1    Sep. 8, 2022

(30) Foreign Application Priority Data
Aug. 9, 2019    (EP) .................................... 19380015

(51) Int. Cl.
*E04H 12/08* (2006.01)
*E04H 12/34* (2006.01)
(Continued)

(52) U.S. Cl.
CPC ............ *F03D 80/50* (2016.05); *E04H 12/085* (2013.01); *E04H 12/342* (2013.01); *F03D 13/20* (2016.05);
(Continued)

(58) Field of Classification Search
CPC ... E04H 12/085; E04H 12/342; E04H 12/344; F05B 2240/912; F05B 2230/61; F03D 80/50; F03D 13/20; F03D 13/205
See application file for complete search history.

(56) References Cited

U.S. PATENT DOCUMENTS 6,467,233 B1 * 10/2002 Maliszewski ........... F03D 13/20
290/55
2014/0054110 A1 * 2/2014 Fernandez Gomez ... E04G 3/30
182/19
(Continued)

FOREIGN PATENT DOCUMENTS

EP    3260409 A1    12/2017
EP    3492736 A1 *  6/2019    ........... E04H 12/085
(Continued)

OTHER PUBLICATIONS

PCT International Search Report & Written Opinion mailed Nov. 12, 2020 corresponding to PCT International Application No. PCT/EP2020/071206.

*Primary Examiner* — Christine T Cajilig
(74) *Attorney, Agent, or Firm* — Schmeiser, Olsen & Watts LLP (57) ABSTRACT

A tower for a wind turbine extending axially along a longitudinal axis of the wind turbine includes a rail attached to an external surface of the tower, the rail providing a guide to which a service trolley is attachable in order to be movable along the rail. The tower includes: a plurality of axially adjacent tower segments, each tower segment extending axially between two axial ends, a respective flange being provided at one or both of the axial ends for connecting the respective tower segment to another tower segment. The rail is provided at the flange.

13 Claims, 7 Drawing Sheets

(51) Int. Cl.
*F03D 13/20* (2016.01)
*F03D 80/50* (2016.01)

(52) U.S. Cl.
CPC ..... *F05B 2230/61* (2013.01); *F05B 2240/912* (2013.01)

(56) References Cited

U.S. PATENT DOCUMENTS

| | | | |
|---|---|---|---|
| 2014/0286788 A1* | 9/2014 | Cho | B66C 23/207 416/244 R |
| 2019/0234096 A1* | 8/2019 | Fang | E04H 12/20 |
| 2019/0338757 A1* | 11/2019 | Helmens | B66C 23/32 |

FOREIGN PATENT DOCUMENTS

| | | |
|---|---|---|
| KR | 20120114981 A | 10/2012 |
| KR | 101225690 B1 | 1/2013 |
| WO | 2012119963 A1 | 9/2012 |
| WO | 2014150950 A2 | 9/2014 |

\* cited by examiner

TOWER FOR A WIND TURBINE

CROSS-REFERENCE TO RELATED APPLICATIONS

This application claims priority to PCT Application No. PCT/EP2020/071206, having a filing date of Jul. 28, 2020, which claims priority to EP Application No 19380015.8, having a filing date of Aug. 9, 2019, the entire contents both of which are hereby incorporated by reference.

FIELD OF TECHNOLOGY

The following relates to a tower for wind turbine. The following further relates to an assembly comprising a tower for a wind turbine and a lifting apparatus for operating a service platform along an external surface of the tower.

BACKGROUND

The tower of a wind turbine may include a plurality of axially adjacent tower segments. Each tower segment has the shape of a hollow cylinder extending along a longitudinal axis. Two adjacent tower segments are normally connected to each other by means of bolt connections, which fix to each other respective flanges of the tower segments. Flanges may be of the "T" type, i.e. with bolt connections provided both on the inner and on the outer side of the tower segments. A lifting apparatus may be used for operating a service platform along an external surface of the tower for fixing the bolt connections provided on the outer side of the tower segments. The same lifting apparatus and service platform may be used for any kind of operations, which may be required on the outer surface of the tower of a wind turbine, also independently from the bolt connections provided between the tower segments. Known lifting apparatuses include telescopic or crane basket, which are difficult to manage and expensive in particular for wind turbine of great dimensions.

Other lifting apparatuses are at least partially integrated in the tower of a wind turbine, but are difficult to manage and expensive, too. For example, WO 2012/119963 A1 describes a lifting apparatus, which is based on attaching an external peripheral rail on the outer surface of the tower. EP 3260409 A1, instead, discloses a rail parallel to the axis of the tower and a carriage movable along the rail and including a crane attached thereto. The carriage is movable up and down the turbine tower along the rail track.

SUMMARY

An aspect relates to a tower for a wind turbine which permits to overcome the problems, which were cited above with reference to the prior art.

According to a first aspect of embodiments of the present invention a tower for a wind turbine is provided, which extend axially along a longitudinal axis of the wind turbine. The tower comprises:
  a plurality of axially adjacent tower segments, each tower segment extending axially between two axial ends, a respective flange being provided at one or both of said axial ends for connecting the respective tower segment to another tower segment,
  a rail attached to an external surface of at least one tower segment, the rail being provided at the flange, the rail providing a guide to which a service trolley is attachable in order to be movable along the rail.

According to a second aspect of embodiments of the present invention an assembly is provided, which includes a tower for a wind turbine as described above and a service trolley attached to the rail in order to be movable along the rail.

According to a third aspect of embodiments of the present invention a method for mounting and/or servicing a tower for a wind turbine is provide, which includes the steps of:
  providing at least a first tower segment and a second tower segment, each tower segments extending axially between a first and a second axial end, a rail being provided at least at the second axial end of the second tower segment,
  attaching a service trolley on the rail in order to be movable along the rail,
  attaching the second axial end of the first tower segment to the first axial end of the second tower segment,
  fixing the first tower segment and the second tower segment to each other on an inner side of the first tower segment and the second tower segment,
  attaching a service platform to the service trolley,
  using the service platform for fixing the first tower segment and the second tower segment to each other on an outer side of the first tower segment and the second tower segment.

Particularly the method may also define each tower segments so to extend axially between a first and a second axial end. Furthermore a respective flange may be provided at one or both of said axial ends for connecting the respective tower segment to another tower segment. Besides, the rail may be provided at the flange at least at the second axial end of the second tower segment.

In other words, a service trolley may be connected at a first flange, while the service platform can be raised and lowered in a way that it will be in the height of a second flange of the wind turbine tower to perform the work at the second flange. For example, the rail may be connected to the second axial end of the second tower segment, while the service platform will be used to work on another flange at the first axial end of the same second tower segment. Or even another flange further downstream of the wind turbine tower will be accessed.

Advantageously, embodiments of the present invention permits reducing the man-hours and the costs of the resources to get access to the external surface of the tower, increasing the wind speed limit to work. It provides a system for access to the external surface of the tower which has no limitation depending on the length of the tower. Having a railing system on the tower does not require any interface at the ground level. As a suspended platform rotates attached to the rail, the time to get access to the different areas will be optimized. As the service platform is in contact with the tower, the wind speed limit to operate will be higher that with the conventional baskets attached to telescopic arms. A retaining cable connecting the service platform to the tower may be provided to reduce movements of the service platform and improve security and increase the wind speed limit to operate. The retaining cable may be arranged around the tower in a belt configuration and attached to the service platform.

According to embodiments of the present invention, the rail is curved. The rail may have a circular shape coaxial with the longitudinal axis of the wind turbine. According to embodiments of the present invention, the rail extends for 360° about the longitudinal axis of the wind turbine.

According to embodiments of the present invention, the flange is of the "T" type. The flange may comprise a first portion protruding inwards and a second portion protruding outwards, the rail being attached to the second portion of the flange.

According to embodiments of the present invention, bolts are provided for joining together two respective flanges provided at the respective axial ends of two tower segments. Holes for connecting bolts to the flange may be provided on both the first portion and the second portion.

According to embodiments of the present invention, a service platform and a lifting apparatus for operating the service platform are provided. The lifting apparatus connects the cables connecting to the service trolley. The lifting may comprise a plurality of cables connecting the service platform to the service trolley. The cables may be used for operating the service platform parallel to the tower. The service trolley may be used for operating the service platform about the longitudinal axis of the tower.

BRIEF DESCRIPTION

Some of the embodiments will be described in detail, with reference to the following figures, wherein like designations denote like members, wherein.

DETAILED DESCRIPTION

The illustrations in the drawings are schematically. It is noted that in different figures, similar or identical elements are provided with the same reference signs.

Figure 1:
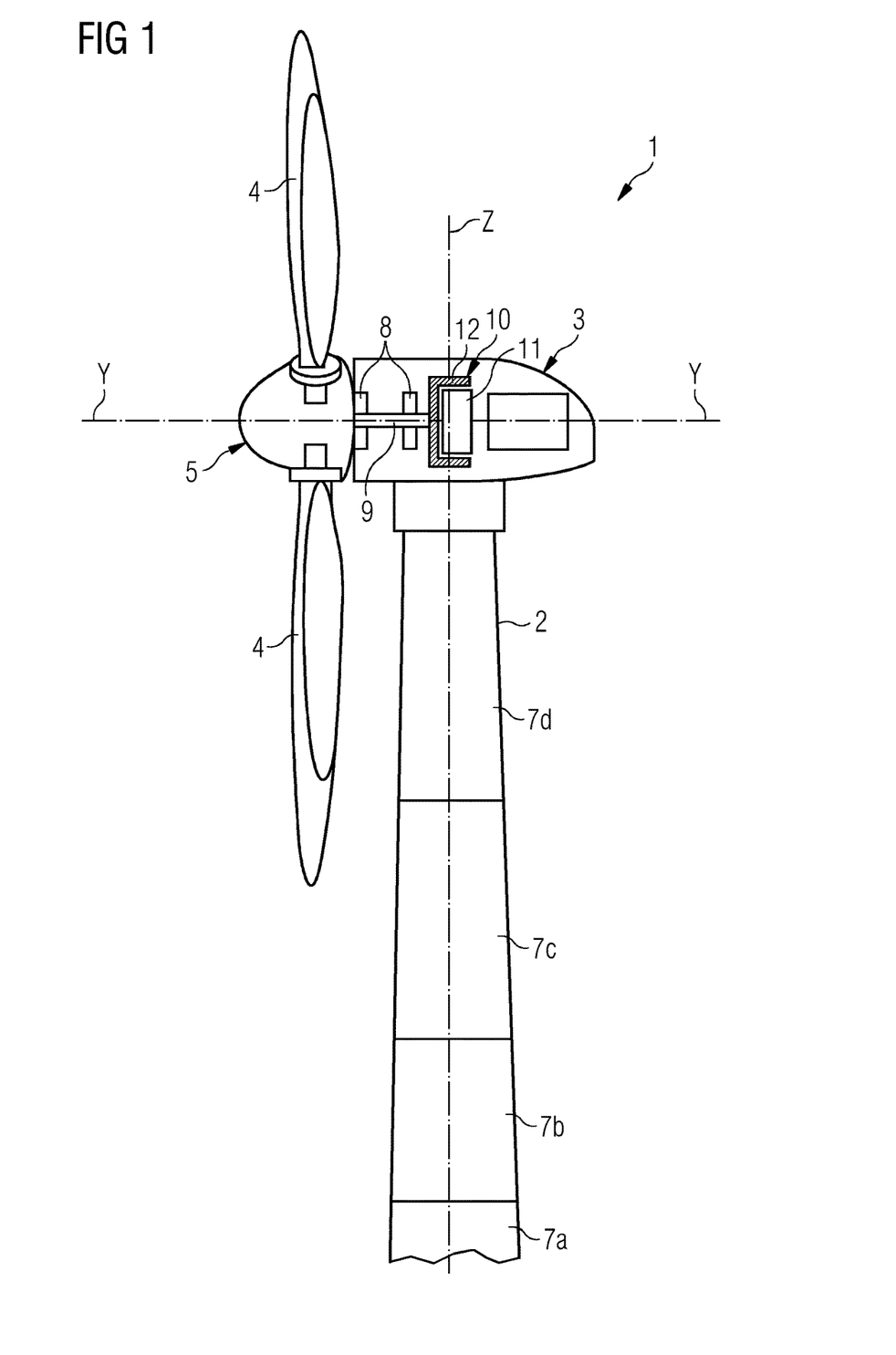
FIG. 1 shows a schematic view of a wind turbine including a tower according to the present invention.

FIG. 1 shows a wind turbine 1 according to embodiments of the invention. The wind turbine 1 comprises a tower 2 axially extending along a longitudinal axis Z of the wind turbine 1. In the following with the term "axial", where not further specified, reference is intended to a direction parallel to the longitudinal axis Z. A nacelle 3 is attached to an upper end of the tower 2. The wind turbine 1 further comprises a wind turbine rotor 5 having three blades 4 (in the perspective of FIG. 1 only two blades 4 are visible). The rotor 5 is attached to the nacelle 3 in order to be rotatable around a rotational axis Y. The tower 2 comprises a plurality of axially adjacent tower segments (four tower segments 7a. 7b, 7c, 7d in the embodiment of FIG. 1). Each tower segment 7a, 7b, 7c, 7d extends axially between two axial ends, where means for connecting the tower segments to each other are provided, as better detailed in the following.

The wind turbine 1 comprises a concentrated winding electrical generator 10. The wind rotor 5 is rotationally coupled with the electrical generator 10 by means of a rotatable main shaft 9. According to other possible embodiments of the present invention (not represented in the attached figures), the wind rotor 5 is rotationally coupled directly with the electrical generator 10 (direct-drive generator configuration). A schematically depicted bearing assembly 8 is provided in order to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y.

Figure 2:
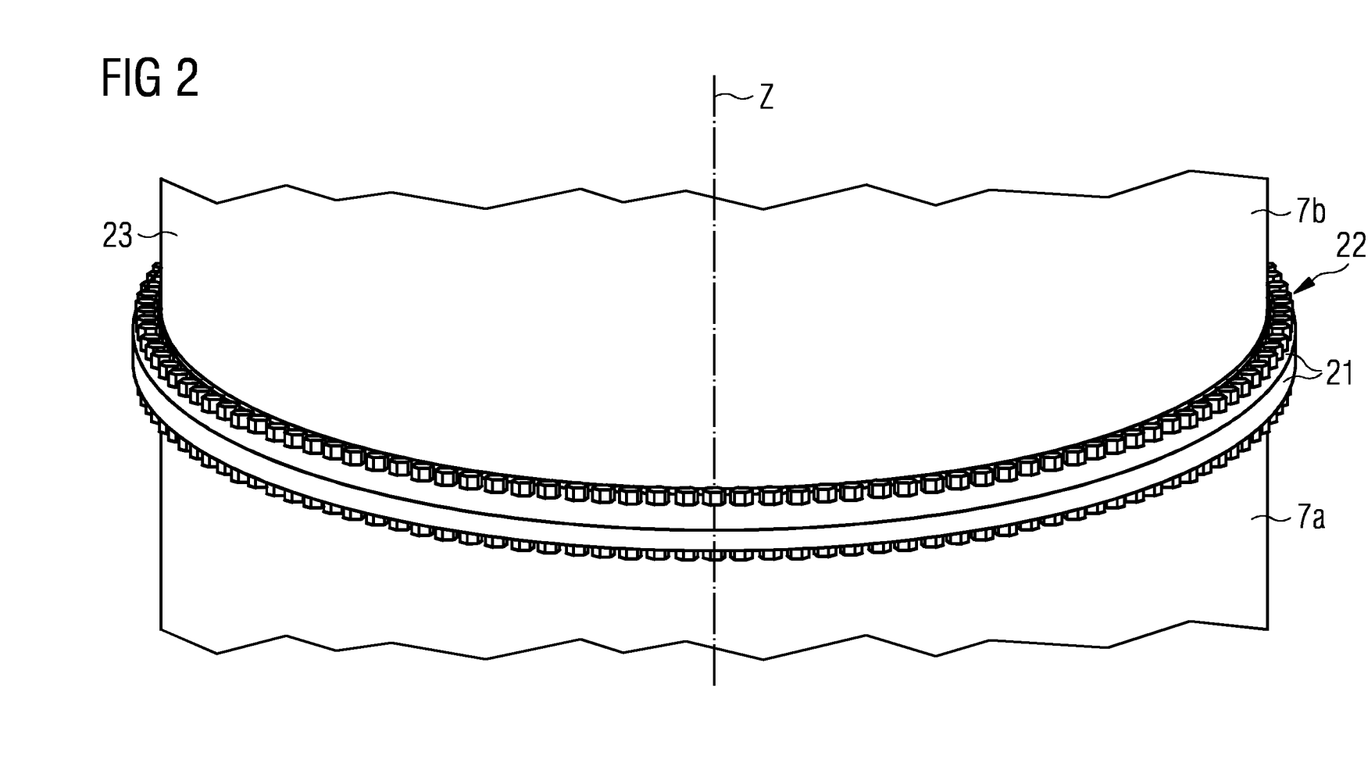
FIG. 2 shows a detail of a tower according to the present invention.

FIG. 2 shows two tower segments 7a, 7b connected together at two respective axial ends by means of a plurality of bolts 22. The bolts 22 join together two respective flanges 21 provided at the respective axial ends of the tower segments 7a, 7b. The flanges 21 protrude from a cylindrical wall 23 of the respective tower segment 7a, 7b according to a direction, which is orthogonally oriented with respect to the longitudinal axis Z. Similar connections may be provided between the tower segments 7b, 7c and between the tower segments 7c, 7d.

Figure 3:
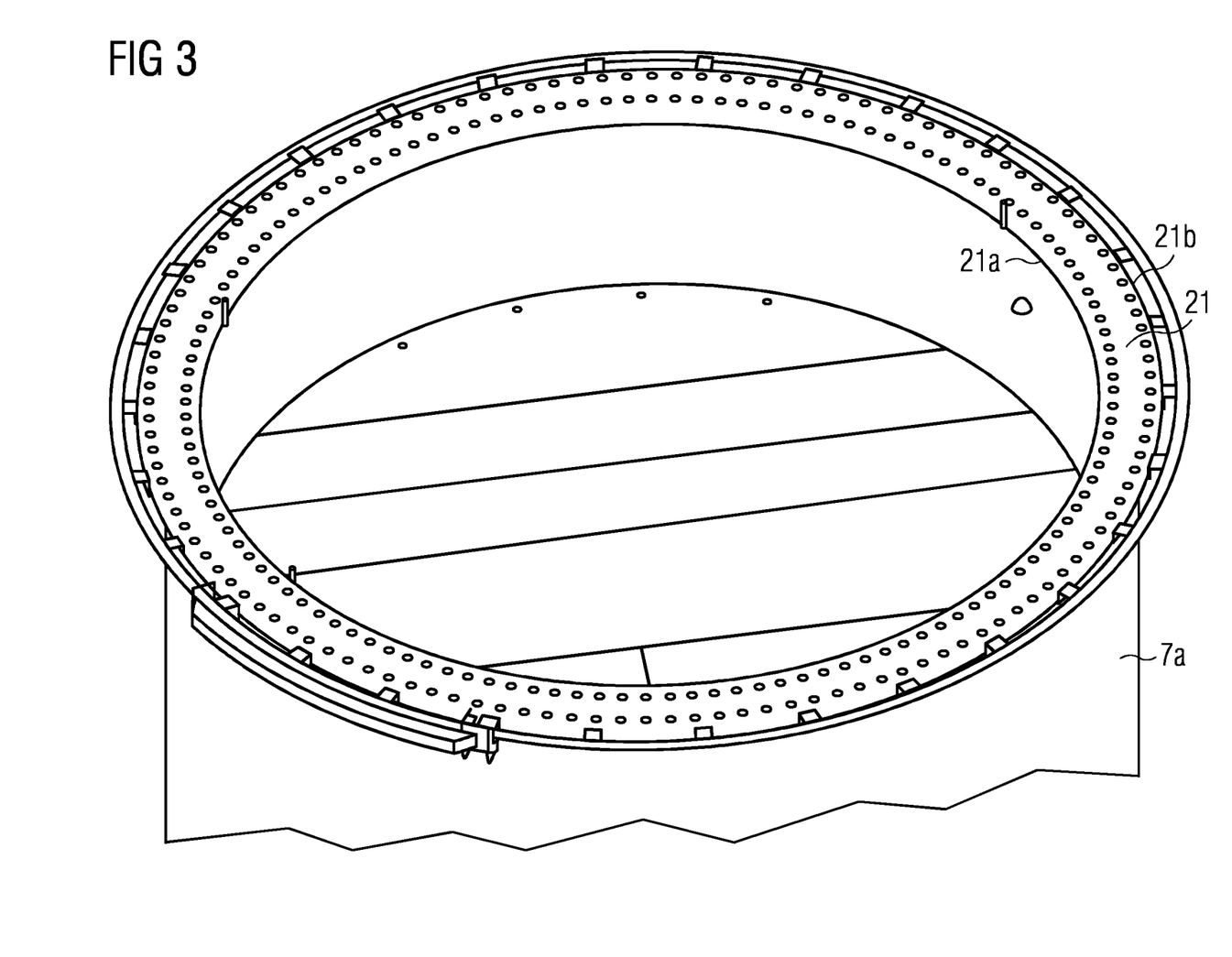
FIG. 3 shows partial view of a tower segment comprised in the tower of FIG. 2.
Figure 4:
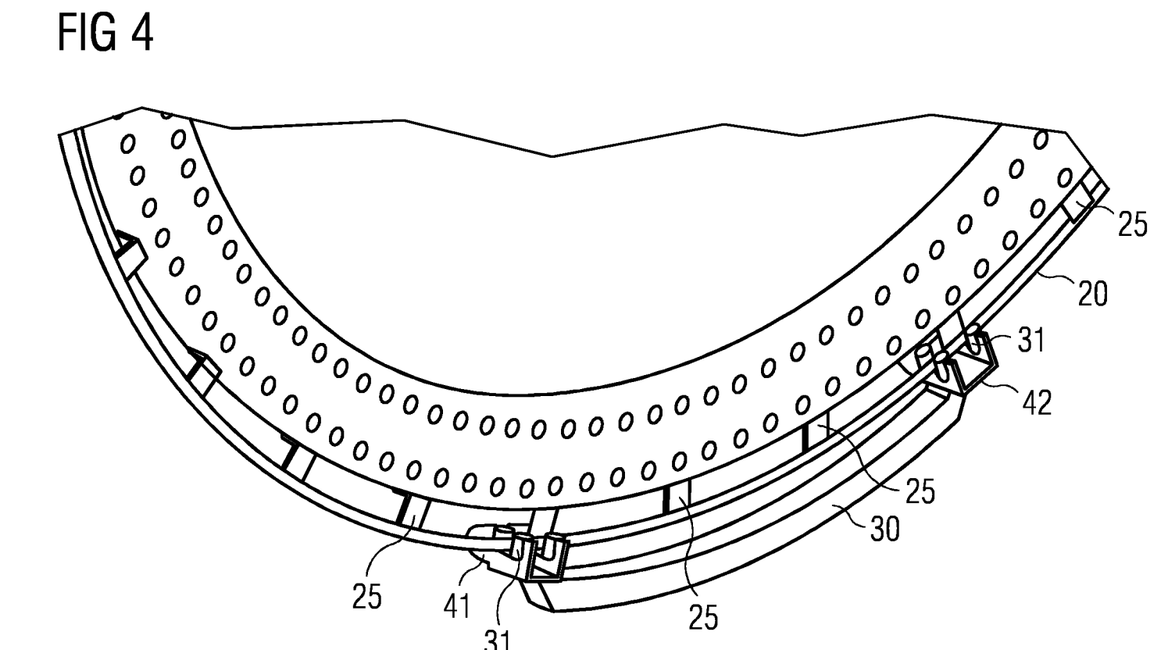
FIG. 4 shows a zoomed detail of the tower segment of FIG. 3.

FIGS. 3 and 4 show more detailed views of the first tower segment 7a. The other tower segments 7b, 7c, 7d may be identical to the first tower segment 7a of FIG. 3. One or both the axial ends of the first tower segment 7a include a respective "T" flange 21. The "T" flange 21 comprises a first portion 21a protruding inwards, i.e. towards the longitudinal axis Z, and a second portion 21b protruding outwards, i.e. opposite to the longitudinal axis Z. Holes for connecting the bolts 22 to the flange 21 are provided on both the first portion 21a and the second portion 21b. The first tower segment 7a comprises a rail 20 attached to the second portion 21b of the flange 21. The rail 20 is a circular ring coaxial with the longitudinal axis Z and extending for 360° about the longitudinal axis Z. According to other embodiments of the present invention (not shown) the rail 20 extends for an angle smaller than 360° about the longitudinal axis Z. According to another embodiment of the present invention (not shown) a rail may be provided also along the first portion 21a of the flange 21. The rail 20 is attached to the respective flange 21 by means of a plurality of supports 25 regularly distributed about the longitudinal axis Z. The supports 25 are fixed, for example by welding, to both the flange 21 and the rail 20.

The rail 20 provides a guide for attaching a service trolley 30 to the tower 20. The service trolley 30 is attachable in order to be translated along the rail 20. The service trolley 30 has a curved shape parallel to the guide 20 and extends for an angle smaller than 360° about the longitudinal axis Z. The coupling between the service trolley 30 and the rail 20 may be provided by means of a wheeled connection or any other sliding connection. The rail 20 may be provided at one or both the axial ends of each tower segment 7a, 7b, 7c, 7d.

Figure 5:
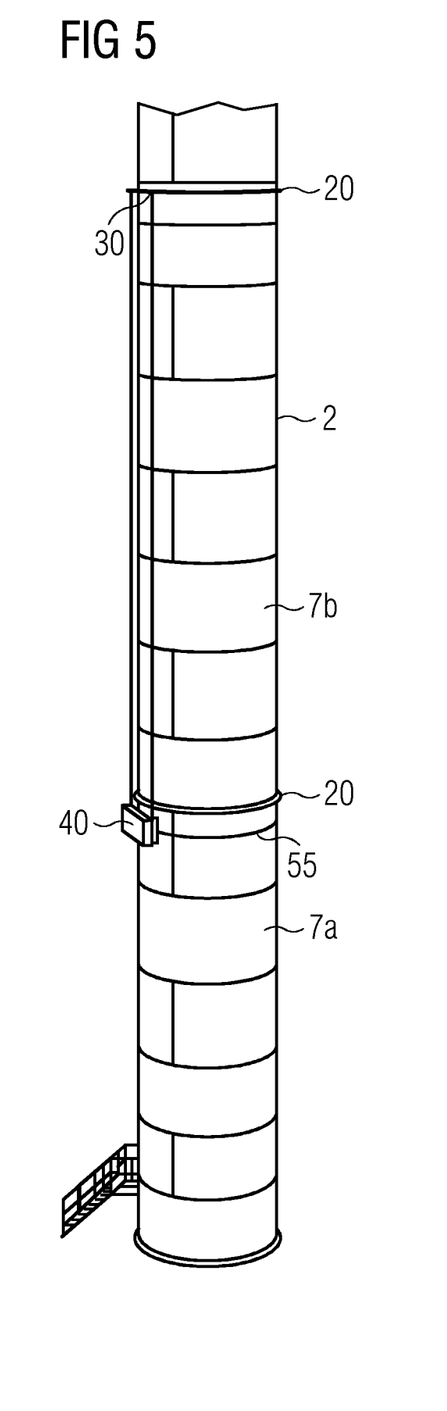
FIG. 5 shows an assembly according to the present invention including a tower of a wind turbine, a service platform and a lifting apparatus for connecting the service platform to the tower.
Figure 6:
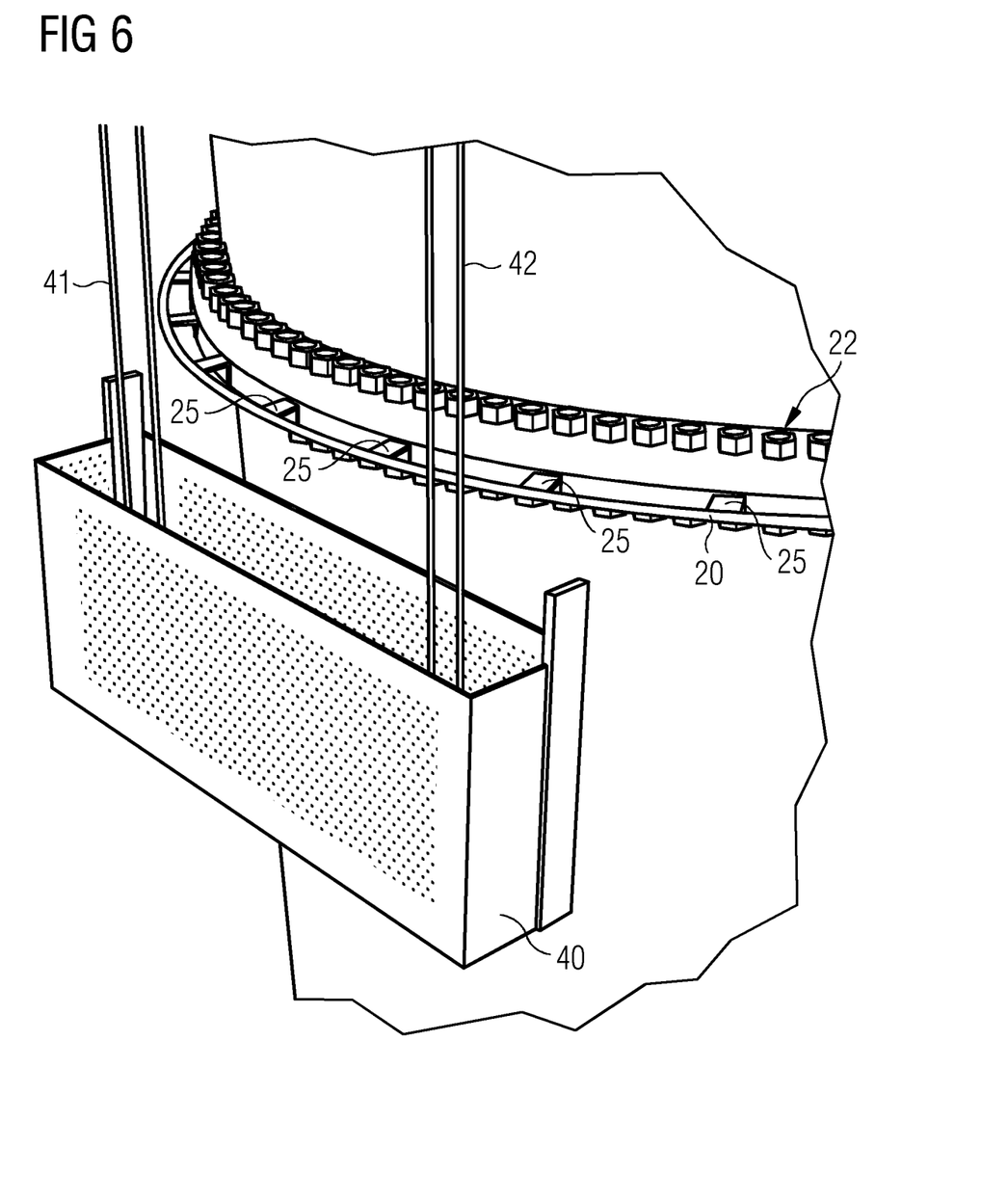
FIG. 6 shows an enlarged detail view of the assembly of FIG. 5.

FIGS. 5 and 6 show how the service trolley 30 and the rail 20 may be used for operating a service platform 40 along the external surface of the cylindrical wall 23. A retaining cable 55 is arranged around the tower 2 in a belt configuration and attached to the service platform 40. The retaining cable 55 reduces movements, in particular lateral movements, of the service platform and improves security and increase the wind speed limit to operate.

In an initial step of a method for mounting the tower 2 a first tower segment 7a and a second tower segment 7b identical to each other are provided. The rail 20 is provided at least at a second axial end of the second tower segment 7b, i.e. to the axial end of the each second tower segment 7b, which in the assembled tower 2 is distanced from the first tower segment 7a. In a following step of the method the service trolley 30 is attached on the rail 20. In a further step of the method, the first tower segment 7a and a second tower segment 7b are axially attached to each other, the first axial end of the second tower segment 7b being attached to the first tower segment 7a. The first tower segment 7a and the second tower segment 7b are fixed to each other by means of a plurality of bolts 22 provided on the first portion 21a of the respective flanges 21. Other bolts 22 may be prefixed to the second portion 21b of one of the flanges 21 at the interface between the first tower segment 7a and the second tower segment 7b. In a further step of the method, a service platform 40 is attached to the service trolley 30. The service platform 40 may be attached to the service trolley 30 by means of a lifting apparatus including a plurality of cables 41, 42, which connect the service platform 40 may be attached to the service trolley 30. The cable may be used to operate the service platform 40 in a direction parallel to the longitudinal axis Z. The position of the service platform 40 about the longitudinal axis Z can be varied by sliding the service trolley 30 along the rail 20. In a further step of the method, the service platform 40 is used by operators for fixing the plurality of bolts 22 on the second portion 21b of the flanges 21 at the interface between the first tower segment 7a and the second tower segment 7b. Bolts 22 of a further downstream flange between a tower segment and another tower segment are accessed.

Figure 7:
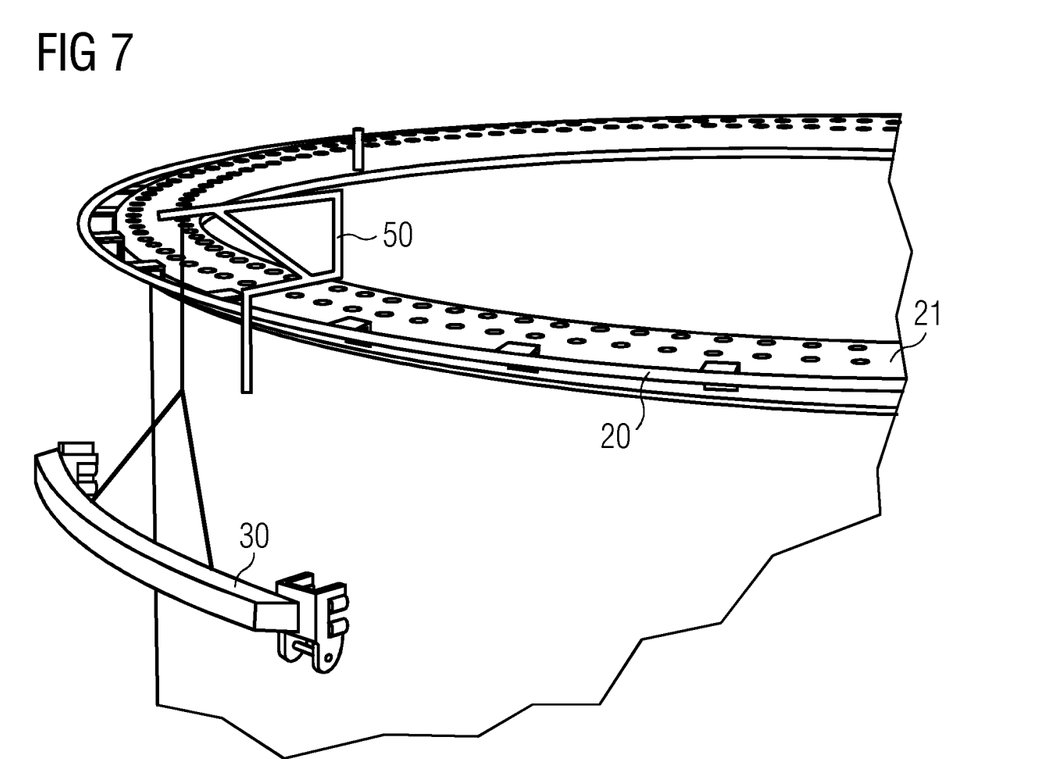
FIG. 7 illustrates operative steps of a method for mounting a tower for a wind turbine according to the present invention.

FIG. 7 shows a further step of the method, wherein a parapet clamp 50 is used for removing the service trolley 30 from the second axial end of the second tower segment 7b. In a further step of the method, the service trolley 30 may be attached to a third tower segment 7c for attaching the third tower segment 7c to the second tower segment 7b in an analogous way to that above described for the first tower segment 7a and the second tower segment 7b.

According to other embodiments of the present invention, the rail 20 may be used for performing other service and maintenance operations on the external surface of the tower 2.

According to other embodiments of the present invention (not shown) the rail 20 may be provided at an intermediate axial position between the two axial ends of a tower segment 7a, 7b, 7c, 7d.

According to other embodiments of the present invention (not shown) the rail 20 may be provided on the external surface of a tower 2 for a wind turbine not having an axially segmented structure.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A tower for a wind turbine-extending axially along a longitudinal axis of the wind turbine, the tower comprising:
a plurality of axially adjacent tower segments, each tower segment extending axially between two axial ends, a respective flange being provided at one or both of the two axial ends for connecting the respective tower segment to another tower segment; and
a rail attached to an external surface of at least one tower segment, the rail being provided at the flange, the rail providing a guide to which a service trolley is attachable in order to be movable along the rail.

2. The tower according to claim 1, wherein the rail is curved.

3. The tower according to claim 2, wherein the rail is coaxial with the longitudinal axis of the wind turbine.

4. The tower according to claim 3, wherein the rail extends for 360° about the longitudinal axis of the wind turbine.

5. The tower according to claim 1, wherein the flange is of the "T" type.

6. The tower according to claim 5, wherein the flange comprises a first portion protruding inwards and a second portion protruding outwards, the rail being attached to the second portion of the flange.

7. The tower according to claim 5, wherein bolts are provided for joining together two respective flanges provided at the respective axial ends of two tower segments.

8. The tower according to claim 6, wherein holes for connecting bolts to the flange are provided on both the first portion and the second portion.

9. An assembly including the tower for the wind turbine according to claim 1 and a service trolley attached to the rail in order to be movable along the rail.

10. The assembly according to claim 9, further comprising a service platform and a lifting apparatus for operating the service platform along an external surface of the tower, the lifting apparatus connecting the service platform to the service trolley.

11. The assembly according to claim 10, wherein the lifting apparatus comprises a plurality of cables.

12. A method for mounting and/or servicing a tower for a wind turbine, the method comprising:
providing at least a first tower segment and a second tower segment, each tower segments extending axially between a first axial end and a second axial end, a respective flange being provided at one or both of the axial ends for connecting the respective tower segment to another tower segment, a rail being provided at the flange at least at the second axial end of the second tower segment;
attaching a service trolley on the rail in order to be movable along the rail;
attaching the second axial end of the first tower segment to the first axial end of the second tower segment;
fixing the first tower segment and the second tower segment to each other on an inner side of the first tower segment and the second tower segment;
attaching a service platform to the service trolley; and
using the service platform for fixing the first tower segment and the second tower segment to each other on an outer side of the first tower segment and the second tower segment.

13. The method according to claim 12, wherein the service platform is attached to the service trolley and operated by means of a lifting apparatus including a plurality of cables.

* * * * *